Oct. 8, 1968             M. ANNIS             3,404,599
APPARATUS AND METHOD FOR PRODUCING A HIGH VELOCITY BEAM
OF GAS MOLECULES AND THE LIKE
Filed Aug. 31, 1966

3,404,599
APPARATUS AND METHOD FOR PRODUCING A HIGH VELOCITY BEAM OF GAS MOLECULES AND THE LIKE

Martin Annis, Newtonville, Mass., assignor to American Science and Engineering, Inc., Cambridge, Mass., a corporation of Massachusetts
Filed Aug. 31, 1966, Ser. No. 576,465
24 Claims. (Cl. 89—1)

ABSTRACT OF THE DISCLOSURE

A container generally in the shape of a cartridge carries the gas molecules to be accelerated and has a frangible cap over the forward end. An explosive charge propels the cartridge through a rifle barrel toward the entrance of an analyzing chamber. The end of the rifle barrel is connected to the entrance of the analyzing chamber by a section that stops the cartridge, breaks the frangible cap and thereby allows the molecules to escape from the cartridge into the analyzing chamber with velocity corresponding substantially to the highest velocity achieved by the cartridge.

---

This invention relates to an apparatus and method for accelerating an aggregate of known composition to an extremely high velocity and in particular to provide for accelerating an aggregate such as neutral gas or liquid molecules, dust particles and the like, up to a speed of from 1 to 10 km./sec.

There is a need for a better understanding of the behavior and interaction of such aggregates with gas molecules and/or solids at speeds in the order of 1 to 10 km./sec.; the range in which high altitude supersonic and hypersonic aircraft and missiles travel. However, none of the known methods of accelerating aggregates are satisfactory for this purpose due, on the one hand, to limitations in techniques, and, on the other hand, to failure to produce the speed desired.

This invention accordingly has for its principal objects to provide an apparatus and method of accelerating an aggregate of known composition to an extremely high velocity, to wit, in the order of 1 to 10 km./sec.; to provide for effecting acceleration without having to electrically charge the aggregate and subsequently discharge it in a complex apparatus such as the molecular beam apparatus required in one of the known methods of accelerating gas molecules; to provide for effecting acceleration by means of existing readily available devices thereby eliminating the need for expensive, specially designed equipment; and to provide an apparatus and method especially suited for research.

It is to be understood that while the invention contemplates velocities in the order of 1 to 10 km./sec., ranges of a lower or higher order may also be produced.

As herein illustrated, the apparatus for effecting the desired velocity comprises a vehicle within which the aggregate is encapsulated, means for propelling the vehicle up to a predetermined velocity, and means for separating the aggregate from the vehicle when the desired velocity is reached to permit undeterred movement of the aggregate as an entity in the direction of propulsion to a test chamber. The vehicle is a hollow cylindrical container closed at one end and provided with a closure at the other end which may be opened to permit escape of the aggregate. The closure may be a thin frangible cap applied to the open end to hold the aggregate encapsulated until the desired velocity is reached; for example, a thin plastic or metal cap, scored diametrically, or a thin low permeability stretch elastomer cap. Optionally, a valve may be used. The vehicle may be propelled to the desired velocity in the barrel of a gun by means of a suitable propellant and when employing a conventional cartridge as the propellant, is provided with a solid base which is adapted to fit into the nose of the cartridge in place of the bullet and has a hollow neck of smaller diameter within which the aggregate is encapsulated. When the closure is a cap it is ruptured at the muzzle of the gun barrel or at some predetermined point beyond the muzzle and substantially simultaneously the vehicle is stopped. For this purpose a part is supported adjacent the muzzle of the barrel which intercepts the vehicle, but permits the aggregate to continue in the direction of propulsion. The cap is ruptured either by the part which stops the vehicle or by an inertia element situated within the vehicle. When the closure is a valve, the latter is spring-loaded so that it remains on its seat until the muzzle velocity is reached or some predetermined velocity when it is unseated and becomes latched in an open position.

The method in its broadest aspect comprises encapsulating an aggregate of known composition in a vehicle, propelling the vehicle up to the desired velocity, and arresting the movement of the vehicle and simultaneously releasing the aggregate from the vehicle so that it continues to move as an entity free of the vehicle in the direction of propulsion.

The invention will now be described in greater detail with reference to the accompanying drawings wherein.

Figure 1:
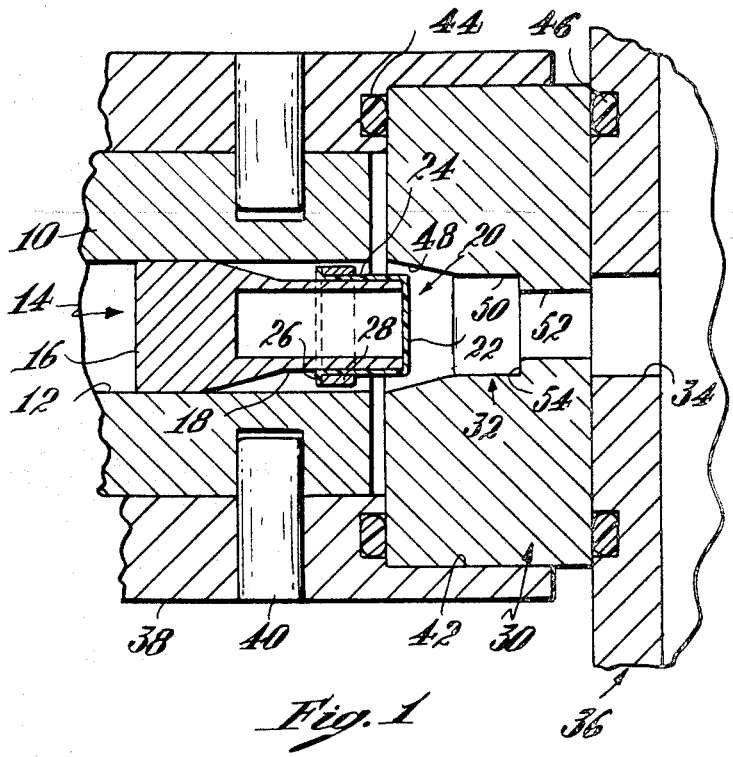
FIG. 1 is a diametrical section at the forward end of the gun barrel showing a vehicle in the form of a cylindrical container as it is about to leave the muzzle of the gun, a part mounted on the gun for intercepting the vehicle as it leaves the muzzle for bursting the cap and arresting the vehicle, and a test chamber into which the released aggregate is projected.

Referring to the drawings (FIG. 1) there is shown the forward end of a gun barrel 10 which may have a smooth or rifled bore 12. Any small bore gun may be used for this purpose.

The aggregate of gas which is to be accelerated is encapsulated for this purpose in a vehicle 14 in the form of a cylindrical container designed to fit the bore of the particular gun employed and comprises a solid base 16 adapted to fit into the nose of a cartridge of the caliber used in the gun in place of the bullet, and a hollow neck 18 which may be of smaller diameter than the bore. The aggregate is encapsulated in the container by a cap 20 applied to its open end.

Figure 2:
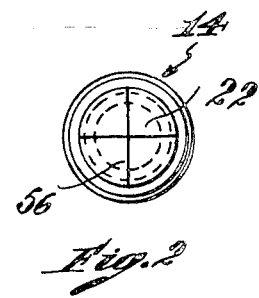
FIG. 2 is an end elevation of the cap applied to the vehicle shown in FIG. 1.

The cap 20, as shown in FIGS. 1 and 2, is comprised of thin plastic and has a circular end portion 22 covering the open end of the neck and a sleeve-like portion 24 which fits onto the neck. The sleeve-like portion 24 is provided with a radial flange 26 and a retaining ring 28 is applied to the neck over the sleeve-like portion and by engagement with the flange 26 holds the cap in place during propulsion of the vehicle.

The aggregate is released from the vehicle as it leaves the muzzle of the gun by breaking the cap and stopping the vehicle. This is accomplished by mounting a part 30 at a suitable distance from the end of the gun which contains an opening 32 therein concentric with the bore of the gun. One end of the opening 32 confronts the muzzle of the gun barrel and the other end is adjacent and concentric with an opening 34 in the wall of a test chamber 36.

Conveniently, the part 30 is supported in position by a structure such as the sleeve 38 shown herein mounted over the end of the barrel and secured thereto by two or more removable bolts 40 inserted through the wall of the sleeve into holes drilled in the barrel of the gun. The sleeve 38 projects forwardly of the end of the gun barrel and contains a circular opening 42 within which the part 30 is seated with its opposite faces held between the bottom of the opening 42 in the sleeve 38 and the outer face of the test chamber 36. To take up some of the shock cushion rings 44 and 46 are supported at opposite sides of the part 30 in grooves in the sleeve 38 and the wall of the test chamber 36.

The opening 32 in the part 30 has an inner conical portion 48, an intermediate cylindrical portion 50 and an outer cylindrical portion 52. The conical and cylindrical portions 48 ad 50 are large enough to permit the neck of the vehicle to pass part way through the part 30. However, the cylindrical portion 52 is of smaller diameter than the neck and will arrest the vehicle when the forward end of the neck strikes the annular shoulder 54 at the junction of the portions 50 and 52. Prior to arrest of the vehicle, however, the retainer ring 28 will be forced rearwardly against the flange 26 by engagement with the portion 50 which is of smaller diameter than the ring and such rearward displacement of the ring on the neck will fracture the cap 20, so that the aggregate in the vehicle will be released just before the vehicle is brought to a stop by engagement with the shoulder 54, thus allowing the released aggregate to continue in the direction of propulsion through the portion 52 and opening 34 into the test chamber. To insure rupture of the cap 20, the face 22 is desirably scored, as illustrated at 56 in FIG. 2, along one or more diameters. At the speed of ejection from the barrel and entrance into the part 32, the bursting of the cap and the arrest of the vehicle are substantially simultaneous.

Figure 3:
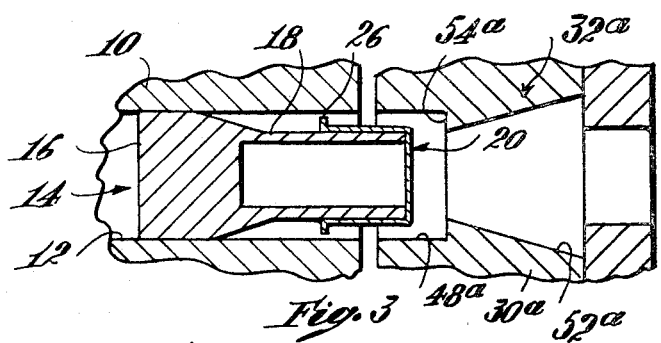
FIG. 3 is a fragmentary diametrical section at the end of the gun showing the vehicle with a modified form of cap.
Figure 4:
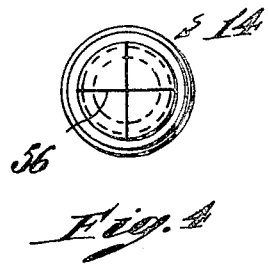
FIG. 4 is an end elevation of the cap shown in FIG. 3.

In FIGS. 3 and 4 there is shown a vehicle like that shown in FIGS. 1 and 2 except for the fact that the cap 20 is comprised of thin metal and is press-fitted over the open end of the neck so that a retaining collar is not required. The circular end 22 of the cap is scored along one or more diameters as shown in FIG. 4. As thus constructed, since the restraining ring is not used, the part which is designed to burst the cap is made somewhat differently. In FIG. 3 this part, identified as 30a, contains an opening 32a concentric with the bore 12 of the gun barrel, one end of which is adjacent the muzzle of the gun barrel and the other end adjacent the opening 34 in the test chamber 36. The part 30a may be mounted at the muzzle of the barrel and in the same fashion as that described above. However, the opening 32a in this form comprises a cylindrical portion 48a adjacent the muzzle of the gun and a conical portion 52a adjacent the opening 34 in the test chamber. An annular shoulder 54a is formed at the junction of the portion 48a with the portion 52a and serves as an abutment for intercepting the flange 26 at the inner end of the sleeve-like portion as the neck enters into the portion 52a which strips the cap from the neck by breaking the face 22 where the latter is scored. The vehicle is arrested by contact of its base 16 with the shoulder 54a.

Figure 5:
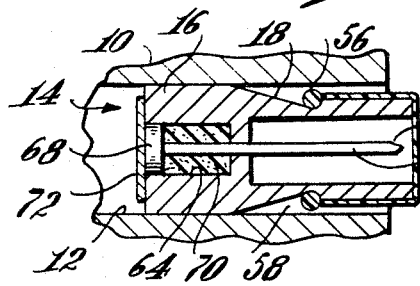
FIG. 5 is a fragmentary diametrical section at the end of the gun showing a vehicle with still another form of cap.

Another form of vehicle is illustrated in FIG. 5, wherein the cap 20 is comprised of a thin low permeability stretch elastomer, has a bead 56 instead of a flange 26 at the inner end of the sleeve-like portion, and the neck of the vehicle is provided with a circumferential half-circular groove 58 for constrictively receiving the bead. In this form the cap is broken by an inertia stake or needle 60 supported within the vehicle with a sharpened end 62 adjacent the inner side of the cap. The base of the vehicle is provided with a chamber 64 concentric with the chamber within which the aggregate is encapsulated which is connected to the latter by an opening 66 through which the rear end of the needle passes into the chamber 64. A head 68 is provided at the rear end of the needle of a diameter to slidably fit within the chamber 64 and a yieldable material, such as sponge or foam rubber 70, is placed about the needle between the head and the forward end of the chamber so as to yieldably hold the needle in a retracted position. A cover plate 72 is applied to the rear end of the base to seal the chamber 64. As thus constructed, as the vehicle is discharged from the muzzle of the gun barrel, and the base is arrested by contact with the shoulder 54a, the momentum of the needle 60 and its head 68 carry it forward so as to punch or pierce the cap. The needle itself is prevented from leaving the vehicle by engagement of its head 68 with the forward end of the chamber 64.

Figure 7:
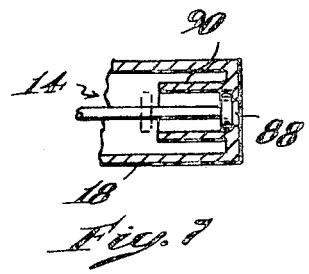
FIG. 7 is a longitudinal section of a modified form of the vehicle shown in FIG. 6.
Figure 6:
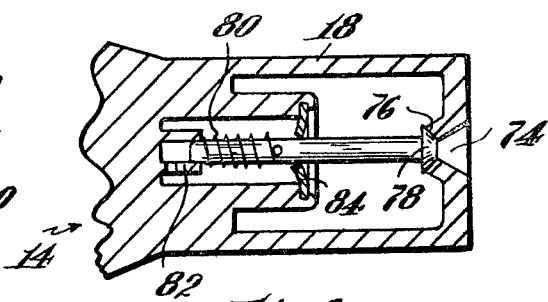
FIG. 6 is a longitudinal section of a vehicle provided with a spring-loaded valve closure.

FIGS. 6 and 7 show two additional forms of vehicle provided with spring-loaded valves for holding the aggregates within them until the desired velocity is reached. The vehicle shown in FIG. 6 is in the form of a cylindrical container, such as previously described, and has a re-entrant end opening 74 which provides a seat 76 for a spring-loaded valve 78 which normally closes the opening. The rear end of the valve 78 is yieldably supported in a coiled spring 80, the latter being supported within a sleeve 82. A friction latch member 84 secured to the sleeve about the valve rod permits the rod to slide freely through it in one direction but prevents movement in the opposite direction. The spring is designed to permit the valve to move rearwardly at muzzle velocity and the friction latch retains the valve in its open position. Now, when the container is intercepted and stops by engagement with a part such as that shown at 30 in FIG. 1 or 30a in FIG. 3, the aggregate is permitted to flow through the opening 74 in the same way as when the cap was ruptured in the form of the vehicles illustrated in FIGS. 1 to 5 inclusive. An advantage of the valve structure is that it is removed from the path of movement of the aggregate so that it does no interfere with such movement.

FIG. 7 shows a modification in which the opening 88 is surrounded by an inwardly extending sleeve 90 within which the valve 92 is displaceable rearwardly and which will maintain the opening closed until the final predetermined velocity is reached. This structure has the advantage that there is no danger of premature opening of the valve. As disclosed in FIG. 6, the valve is displaceable rearwardly against a spring and is latched in its open position.

It is evident from the foregoing that there are numerous ways in which an aggregate may be capsulated for propulsion up to the desired speed and then released when the desired velocity is reached in such fashion as to permit the accelerated aggregate to move forwardly in the direction of propulsion undeterred by any part of the vehicle or closure. It is also evident that while the means for propelling the vehicle, as herein illustrated, is an ordinary gun such, for example, as a light gas gun or a .22 caliber rifle, any other means capable of mechanically propelling the vehicle up to the speed in the order of 1 to 10 km./sec. may be employed and is considered to be within the scope of this invention.

If the aggregate is air at normal temperature and pressure the containers are made ready for use simply by applying a suitable cap or valve to their open ends. If a gas, liquid or solid exclusively of one kind or another is to be employed, then some precautions must be taken to drive out the normal atmosphere and fill the container with the specified aggregate which is to be accelerated exclusively of any other. If desired, a lower than atmospheric pressure or a higher than atmospheric pressure may be used.

It should be understood that the present disclosure is for the purpose of illustration only and that this invention includes all modifications and equivalents which fall within the scope of the appended claims.

I claim:

1. Apparatus for imparting high velocity to an aggregate to be analyzed comprising a vehicle within which the aggregate is encapsulated, an analyzing chamber having an entrance, means defining a channel for carrying said vehicle, means for propelling the vehicle up to a predetermined velocity at the exit of said channel, and means coupling said exit to said entrance for effecting separation of the aggregate from the vehicle when said predetermined velocity is reached and stopping said vehicle to permit undeterred movement of the aggregate as an entity in the direction of propulsion into said entrance for analysis in said analyzing chamber.

2. Apparatus according to claim 1, wherein the vehicle comprises a container closed at one end and open at the other, and a closure applied to the open end to hold the aggregate encapsulated until said predetermined velocity is reached, and said means for effecting separation of the aggregate comprises means operative, at said predetermined velocity, to open the closure and stop the vehicle.

3. Apparatus according to claim 1, wherein the vehicle comprises a container closed at one end and open at the other, with a frangible cap applied to the open end to confine the aggregate in the container, and the means for effecting separation of the aggregate is means operable to rupture the frangible cap and stop the vehicle.

4. Apparatus according to claim 2, wherein the closure is a cap comprised of relatively thin material.

5. Apparatus according to claim 1, wherein the means defining a channel for carrying said vehicle is a gun barrel and the vehicle is provided with a base adapted to fit into the bore of a gun barrel.

6. Apparatus according to claim 1, wherein the vehicle is propelled at a velocity in the order of 1 to 10 km./sec.

7. Apparatus according to claim 1, wherein a gun barrel is employed to guide the vehicle during propulsion up to said predetermined velocity, a cartridge is employed to effect propulsion of the vehicle, and the vehicle corresponds in diameter to the pellet in the nose of a conventional cartridge to enable substituting it for the pellet.

8. Apparatus according to claim 2, wherein the closure is a cap which fits over an open end of the container, a retainer ring encircles the open end and secures the cap thereto, and the means for effecting separation comprises means at the muzzle of a gun barrel comprising said channel operable successively to arrest the ring and then the vehicle thereby to release the cap.

9. Apparatus according to claim 2, wherein the closure comprises a cap having a sleeve which fits over the open end of the container, a retainer ring fits snugly over the sleeve at the open end of the container, and the means for effecting separation comprises a part mounted adjacent the muzzle of a gun comprising said channel containing a hole concentric with the bore thereof, said hole embodying a first portion of smaller diameter than the retaining ring which intercepts the ring, and a second portion of smaller diameter than the capped end of the container which intercepts the container thereby successively bursting the cap and arresting the container.

10. Apparatus according to claim 2, wherein the closure comprises a cap embodying an end face confronting the open end of the container, a sleeve fitted over the end, and a retaining ring encircling the sleeve holding the cap in place at the open end, and the means for effecting separation comprises a part detachably mounted on the muzzle of a gun barrel comprising said channel which contains an opening concentric with the bore, said opening having a proximate portion next to the muzzle which is conical, the entrance to which is larger in diameter than the ring and the exit from which is smaller in diameter than the ring, an intermediate cylindrical portion which corresponds, substantially in diameter to the outside diameter of the body, and a remote portion which corresponds substantially in diameter to the inside diameter of the container body, said conical portion being adapted to intercept the retaining ring to burst the cap, said intermediate portion being adapted to arrest the container body by contact with the leading end thereof, and the remote portion being adapted to conduct the released aggregate from the arrested container to the test chamber.

11. Apparatus according to claim 2, wherein the vehicle has a solid base and a tubular body joined at one end to the base and open at the other end, said base being of larger diameter than the body, and said closure comprising a cap fitted over the open end of the body, said cap having a radial flange, and said means for effecting separation comprises a part mounted adjacent the muzzle of a gun comprising said channel in the form of a rigid plate containing an opening through it which is concentric with the bore of said gun, said opening comprising a cylindrical portion extending part way through the plate corresponding in diameter to the base of the container, and a shoulder situated in the opening intermediate its opposite ends, said shoulder having an inside diameter less than that of the base of the container but greater than that of the body, said shoulder being operable by contact of said radial flange on the cap therewith to strip the cap from the body and bring the container to rest.

12. Apparatus according to claim 5, wherein the means for effecting separation comprises a part at the muzzle of the barrel containing an opening concentric with the bore thereof which is of smaller diameter than the base of the vehicle and of larger diameter than the body, operable to arrest the vehicle, and means internally of the vehicle operable, by its momentum when the vehicle is arrested, to burst a cap covering a front opening of said vehicle.

13. Apparatus according to claim 5, wherein the means for effecting separation comprises a part at the muzzle of the barrel containing an opening concentric with the bore thereof which is of smaller diameter than the base of the vehicle and of larger diameter than the body, operable to arrest the vehicle, a punch supported within the vehicle for movement axially thereof with one end at the base and the other end adjacent a cap covering a front opening of said vehicle, said punch being operable upon arrest of the vehicle to burst the cap, and means at the inner end of the punch operable to prevent the latter from leaving the vehicle when the latter is arrested.

14. Apparatus according to claim 2, wherein the closure is a cap comprised of an elastomer, elastically fitted to the open end of the container, and the means for effecting separation is a punch supported within the container for longitudinal movement therein from an inoperative position, with its forward end behind that portion of the cap stretched across the open end of the container, to a position projecting through the open end, means limiting forward movement of the punch to prevent expulsion from the container, and means constraining the punch in its inoperative position until the container is arrested.

15. Apparatus according to claim 2, wherein the closure is a cap comprised of an elastomer, elastically applied to the open end of the container by means of a sleeve-like portion which fits the container, and an elastic bead at the end of the sleeve, said container having an encircling groove for constrictively receiving said elastic bead.

16. The method of producing a beam of high intensity, high velocity, electrically neutral aggregate comprising encapsulating the aggregate in a vehicle, propelling the vehicle to the desired velocity with the aggregate encapsulated therein toward the entrance of an analyzing chamber, and when said predetermined velocity is reached effecting separation of the vehicle and the aggregate so that the aggregate continues on in the direction of propulsion as an entity undeterred by the vehicle, and directing said aggregate into said analyzing chamber through said entrance while excluding said vehicle therefrom.

17. A method according to claim 16, comprising encapsulating the aggregate at a higher than atmospheric pressure.

18. A method according to claim 16, comprising encapsulating the aggregate at lower than atmospheric pressure.

19. A method according to claim 16, comprising effecting release of the aggregate by arresting movement of the vehicle when the latter has reached said predetermined velocity without interfering with continued movement of the aggregate.

20. A method according to claim 16, comprising effecting the release of the aggregate when said predetermined velocity is reached and then arresting forward movement of the vehicle.

21. A method according to claim 16, comprising substantially simultaneously opening the vehicle and arresting forward movement thereof.

22. A method according to claim 16, comprising encapsulating the aggregate in a vehicle in the form of a container by securing a frangible cap over the open end thereof, supporting a punch in the container behind the cap, and causing the punch to move through the cap to effect rupture thereof by arresting forward movement of the container substantially instantaneously when it reaches said predetermined velocity.

23. A method according to claim 16, comprising mechanically accelerating the vehicle in the barrel of a gun by means of a cartridge charge.

24. A method according to claim 23, comprising stopping the forward movement of the vehicle as it leaves the muzzle of the gun substantially instantaneously.

References Cited

UNITED STATES PATENTS

| | | | |
|---|---|---|---|
| 889,644 | 6/1908 | Szemerey | 42—1 |
| 2,064,503 | 12/1936 | Temple | 89—1 |

BENJAMIN A. BORCHELT, *Primary Examiner.*